United States Patent
Grover et al.

(10) Patent No.: US 8,850,109 B2
(45) Date of Patent: Sep. 30, 2014

(54) CONTENT ADDRESSABLE MEMORY DATA CLUSTERING BLOCK ARCHITECTURE

(75) Inventors: David B. Grover, Eden Prairie, MN (US); Richard J. Stephani, St. Paul, MN (US); Gordon W. Priebe, Champlin, MN (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 191 days.

(21) Appl. No.: 13/334,254

(22) Filed: Dec. 22, 2011

(65) Prior Publication Data

US 2013/0166850 A1    Jun. 27, 2013

(51) Int. Cl.
*G06F 13/00*    (2006.01)

(52) U.S. Cl.
USPC ......................................................... 711/108

(58) Field of Classification Search
CPC combination set(s) only.
See application file for complete search history.

(56) References Cited

U.S. PATENT DOCUMENTS

| | | | |
|---|---|---|---|
| 4,517,661 A * | 5/1985 | Graf et al. | 714/25 |
| 4,737,909 A * | 4/1988 | Harada | 711/3 |
| 5,136,699 A * | 8/1992 | Yokoyama | 711/220 |
| 5,386,526 A * | 1/1995 | Mitra et al. | 711/3 |
| 5,956,751 A * | 9/1999 | Lai | 711/172 |
| 6,324,087 B1 * | 11/2001 | Pereira | 365/49.16 |
| 6,597,596 B2 | 7/2003 | Gordon et al. | 365/49 |
| 6,763,425 B1 | 7/2004 | Pereira | 711/108 |
| 7,219,188 B1 * | 5/2007 | Pereira | 711/108 |
| 7,251,707 B1 | 7/2007 | Pereira | 711/108 |
| 8,031,501 B1 | 10/2011 | Nataraj et al. | 365/49.1 |
| 8,086,585 B1 * | 12/2011 | Brashers et al. | 707/705 |
| 2006/0294297 A1 * | 12/2006 | Gupta | 711/108 |
| 2011/0307769 A1 * | 12/2011 | Ramaraju et al. | 714/801 |

* cited by examiner

*Primary Examiner* — Charles Rones
*Assistant Examiner* — Han Doan
(74) *Attorney, Agent, or Firm* — Christopher P. Maiorana, PC

(57) ABSTRACT

An apparatus having a first circuit and a second circuit. The first circuit may be configured to (i) parse a first data word into a first data portion and a second data portion and (ii) parse a first address into a first address portion and a second address portion. The second circuit generally has a plurality of memory blocks. The second circuit may be configured to store the second data portion in a particular one of the memory blocks using (i) the first data portion to determine the particular memory block and (ii) the first address portion to determine a particular one of a plurality of locations within the particular memory block. The data portion may not be stored in the memory blocks. The particular location may be determined independently of the second address portion.

18 Claims, 7 Drawing Sheets

US 8,850,109 B2

CONTENT ADDRESSABLE MEMORY DATA CLUSTERING BLOCK ARCHITECTURE

FIELD OF THE INVENTION

The present invention relates to memory devices generally and, more particularly, to a method and/or apparatus for implementing a content addressable memory data clustering block architecture.

BACKGROUND OF THE INVENTION

Conventional content addressable memories (i.e., CAMs) compare an input data word with all of the words stored in the CAM. The comparison of the stored words to the input data word (i.e., comparison data word) is done either simultaneously or over a few clock cycles. If any words stored in the CAM match the comparison data word, the CAM presents an output signal (or signals) representing a hit and/or an encoded address of the highest priority matching stored word. Because of how much computation is done in parallel to find the matching words, CAM memories usually have high peak currents and high average power consumptions.

It would be desirable to implement a content addressable memory that provides data clustering block architecture.

SUMMARY OF THE INVENTION

The present invention concerns an apparatus having a first circuit and a second circuit. The first circuit may be configured to (i) parse a first data word into a first data portion and a second data portion and (ii) parse a first address into a first address portion and a second address portion. The second circuit generally has a plurality of memory blocks. The second circuit may be configured to store the second data portion in a particular one of the memory blocks using (i) the first data portion to determine the particular memory block and (ii) the first address portion to determine a particular one of a plurality of locations within the particular memory block. The data portion may not be stored in the memory blocks. The particular location may be determined independently of the second address portion.

The objects, features and advantages of the present invention include providing a content addressable memory data clustering block architecture that may (i) cluster data words into multiple memory blocks, (ii) determine an active memory block based on a portion of a data word, (iii) address the memory blocks with a portion of an address, (iv) reduce power consumption and/or (v) store only a portion of each data word in the memory blocks.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Some embodiments of the present invention may reduce a peak and an average power criteria of a content addressable memory (e.g., CAM) by using particular bits of data words to determine where the data words are stored. When a comparison data word is receive by the CAM, the particular bits may be used to determine which among several memory blocks of the CAM should be included in the comparison.

Figure 1:
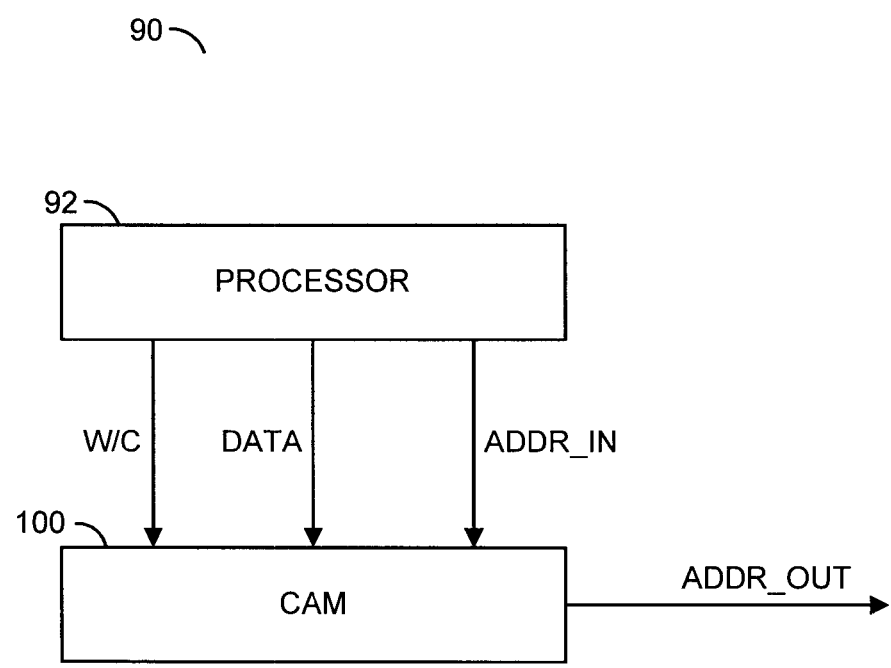
FIG. 1 is a diagram of an apparatus.

Referring to FIG. 1, a diagram of an apparatus 90 is shown. The apparatus (or system) 90 generally comprises a block (or circuit) 92 and a block (or circuit) 100. The circuits 92 to 100 may represent modules and/or blocks that may be implemented as hardware, software, a combination of hardware and software, or other implementations. In some embodiments, the apparatus 90 may be fabricated on (in) one or more die (or chips).

A signal (e.g., W/C) may be generated by the circuit 92 and presented to the circuit 100. The circuit 92 may generate a signal (e.g., DATA) received by the circuit 100. A signal (e.g., ADDR_IN) may be generated by the circuit 92 and received by the circuit 100. The circuit 100 may generate and present a signal (e.g., ADDR_OUT).

The circuit 92 may implement a processor circuit. The circuit 92 is generally able to (i) write data words into the circuit 100 using an address and (ii) request searches using compare data words. To write the data words into the circuit 100, the circuit 92 may assert the signal W/C in a write state (or write condition). The data words being written may be presented in the signal DATA from the circuit 92 to the circuit 100. Respective addresses for the write data words may be presented in the signal ADDR_IN from the circuit 92 to the circuit 100. To search for compare data words, the circuit 92 may assert the signal W/C in a compare state (or compare condition). The compare data words may be presented in the signal DATA from the circuit 92 to the circuit 100. The signal ADDR_IN generally does not convey address information corresponding to the compare data words. The circuit 92 may be fabricated on (in) a die (or chip).

The circuit 100 may implement a content addressable memory circuit. The circuit 100 is generally operational to store representations of the data words received from the circuit 92 while the signal W/C is in the write state. The circuit 100 may also be operational to compare the compare data words received from the circuit 92 with the previously stored data word representations while the signal W/C is in the compare state. The circuit 100 may utilize a portion of the data words in combination with the corresponding addresses to determine the location that the data word representations will be stored in during the writes. In addition, parts of a comparison data word may be used during a compare to limit which stored data word representations may be included in the comparison. If a match is found between a compare data word and one or more stored data word representations, the circuit 100 may prioritize the matches and present an address (or index) associated with the highest priority match in the signal ADDR_OUT. The circuit 100 may be fabricated on (in) a die (or chip) separate from the circuit 92.

Figure 2:
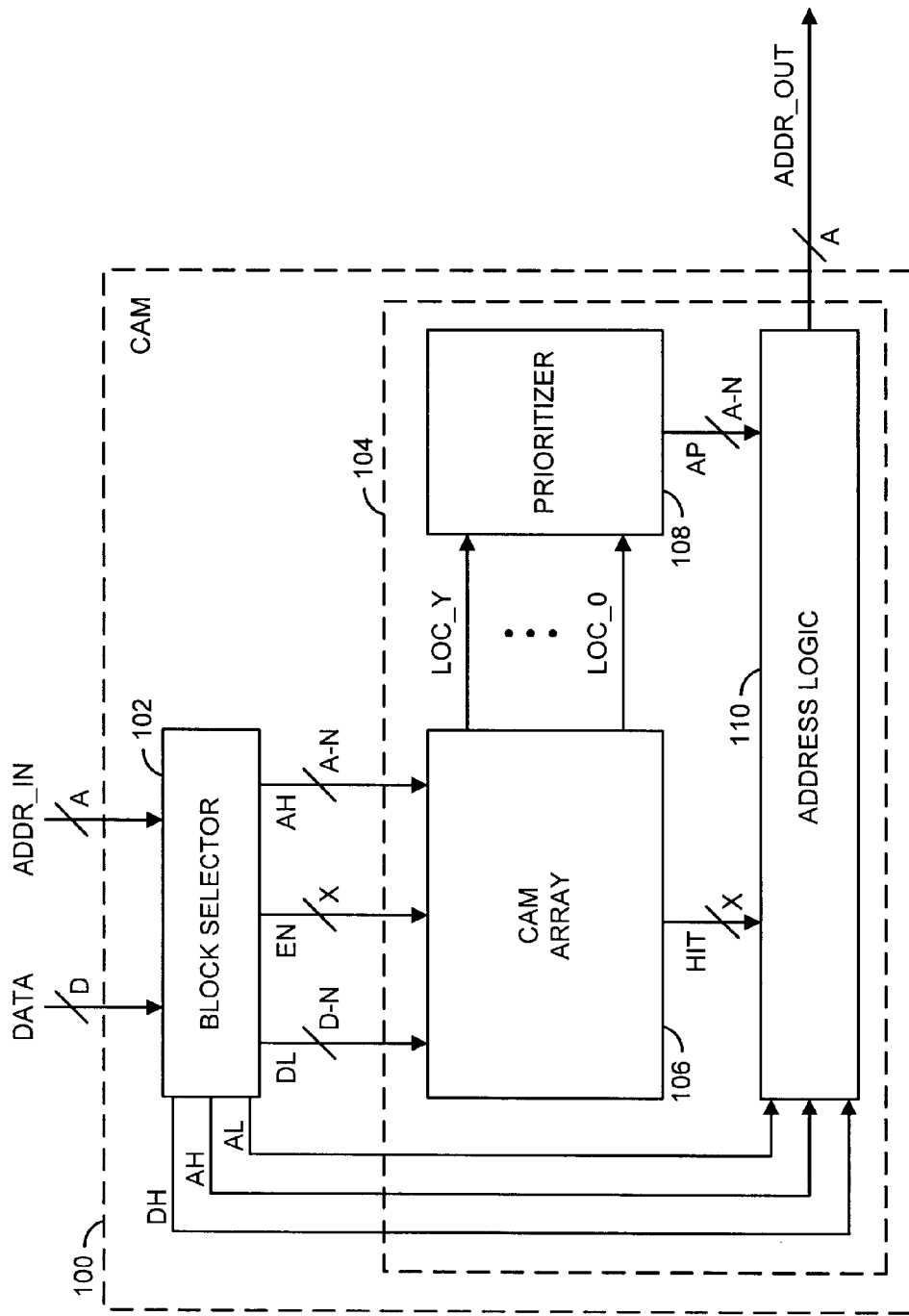
FIG. 2 is a block diagram of a circuit of the apparatus in accordance with a preferred embodiment of the present invention.

Referring to FIG. 2, a block diagram of the circuit 100 is shown in accordance with a preferred embodiment of the present invention. The circuit (or apparatus or device or integrated circuit) 100 generally comprises a block (or circuit) 102 and a block (or circuit) 104. The circuit 104 may comprise a block (or circuit) 106, a block (or circuit) 108 and a block (or circuit) 110. The circuits 102 to 110 may represent modules and/or blocks that may be implemented as hardware, software, a combination of hardware and software, or other implementations.

The signals DATA and ADDR_IN may be received by the circuit 102. The signal DATA may convey an input data value. The signal ADDR_IN may carry an input address value. The circuit 110 may generate the signal ADDR_OUT. The signal ADDR_OUT generally conveys an output address value. A signal (e.g., DH) may be generated by the circuit 102 and received by the circuit 110. The signal DH may carry the higher bits of the input data value. A signal (e.g., DL) may also be generated by the circuit 102 and be received by the circuit 106. The signal DL may convey the lower bits of the input data value. The circuit 102 may also generate a signal (e.g., AH) received by the circuits 106 and 110. The signal AH may carry the higher bits of the input address value. A signal (e.g., AL) may be generated by the circuit 102 and received by the circuit 110. The signal AL may transport the lower bits of the input address value. The circuit 102 may generate a signal (e.g., EN) that is received by the circuit 106. The signal EN may convey multiple enable bits, an enable bit corresponding to each respective memory block in the circuit 106. The circuit 106 may generate a set of signals (e.g., LOC_0-LOC_Y) received by the circuit 108. Each signal LOC_0-LOC_Y may contain a bit that indicates whether the corresponding location includes a match during the comparison. The circuit 106 may also generate a signal (e.g., HIT) received by the circuit 110. The signal HIT may contain multiple bits, each indicating if the corresponding memory block found one or more matches during the comparison. A signal (e.g., AP) may be generated by the circuit 108 and received by the circuit 110. The signal AP may convey a highest priority address value.

The circuit 102 may implement a block selector circuit. The circuit 102 is generally operational to parse multiple (e.g., D) bits of the input data word received via the signal DATA into multiple (e.g., two) data portions. A high (or upper) data portion may include the one or more (e.g., N) most-significant data bits. The high data portion is generally presented in the signal DH. A low (or lower) data portion may include one or more (e.g., D-N) least-significant data bits. The low data portion may be transferred in the signal DL. The circuit 102 may also be operational to parse multiple (e.g., A) bits of the input address value received in the signal ADDR_IN into multiple (e.g., two) address portions. A high (or upper) address portion may include one or more (e.g., A-N) most-significant bits of the input address value. The high address portion is generally presented in the signal AH. A low (or lower) address portion may include one or more (e.g., N) least-significant bits of the input address value. The low address portion may be conveyed in the signal AL.

The circuit 104 may implement a logic circuit. In the write state, the circuit 104 is generally operational to store the low data portion received in the signal DL in a particular memory block among a plurality of memory blocks (e.g., blocks within the circuit 106). Each memory block generally has multiple locations (or addresses) in which the low data portions may be stored. The signal EN may be used to determine the particular memory block. The high address portion may be used to determine a particular location among a plurality of locations within the particular memory block to hold the low data portion. The high data portion is generally not stored in the memory blocks. Furthermore, the particular location may be determined independently of the low address portion.

In the compare state, the circuit 104 may be operational to compare the low data portion received in the signal DL with the low data portions already stored within a given memory block. The given memory block may be determined by the high data portion of the data word being sought. If the compare finds one or more instances of the low data portion, the circuit 104 may present in the signal ADDR_OUT the address (or location) of the highest priority instance.

The circuit 106 may implement a CAM array circuit. In the write state, the circuit 106 is generally operational to store the low data portions among the memory blocks. The memory blocks are generally enabled/disabled by the signal EN. The particular location within the enabled memory block may be controlled by the low address portion in the signal AL.

In the compare state, the circuit 106 may be operational to compare the low data portion received via the signal DL with the low data portions stored in the particular memory block. For each instance of the low data portion found in the particular memory block, the circuit 106 may assert a respective location (or indication) signal LOC_0-LOC_Y. The other location (or indication) signals LOC_0-LOC_Y may be deasserted. The circuit 106 may also assert a respective bit of the signal HIT if at least one instance of the low data portion is found in the particular memory block. The non-matching bits of the signal HIT may be deasserted.

The circuit 108 may implement a prioritizer circuit. In the compare state (and optionally in the write state), the circuit 108 is generally operational to prioritize (or rank) the asserted signals LOC_0-LOC_Y. A variety of prioritization techniques may be implemented. For example, the highest address locations in the memory blocks (corresponding to the signal LOC_Y) may have a top (or highest) priority. The lowest address locations in the memory blocks (corresponding to the signal LOC_0) may have a bottom (or lowest) priority. The other addressable locations between the highest and the lowest addressable locations may have corresponding intermediate priorities. The address location within the particular memory block corresponding to the highest priority asserted signal LOC_0-LOC_Y may be conveyed in the signal AP to indicate the highest priority address portion. Other prioritization schemes may be implemented to meet the criteria of a particular application.

The circuit 110 may implement an address logic circuit. In the write state, the circuit 110 is generally operational to generate an internal address by concatenating the high address portion and the high data portion. The circuit 110 may subsequently store the low address portion received in the signal AL at the internal address location within an internal memory circuit. In the compare state, the circuit 110 may be operational to generate the output address in the signal ADDR_OUT by concatenating the highest priority address portion received in the signal AP and an internal address portion read from the internal memory circuit.

Figure 3:
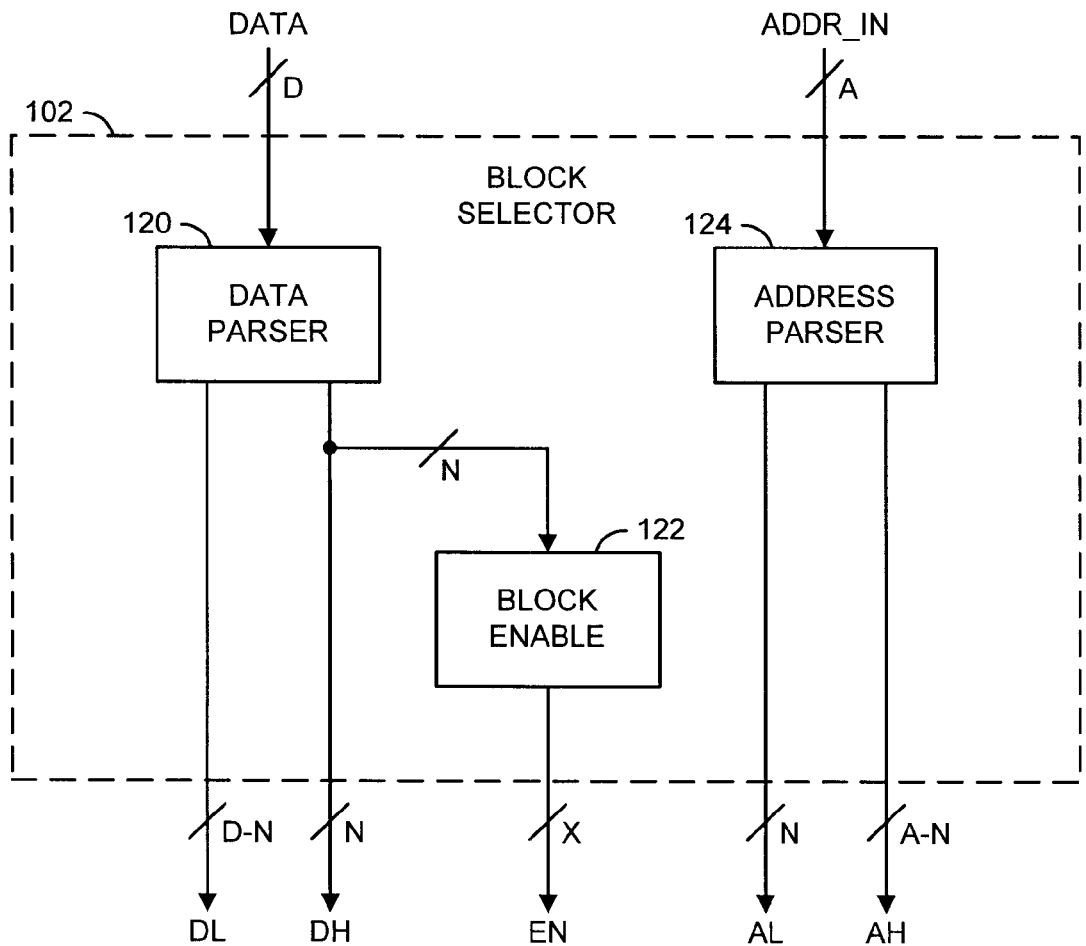
FIG. 3 is a block diagram of an example implementation of a block selector circuit.

Referring to FIG. 3, a block diagram of an example implementation of the circuit 102 is shown. The circuit 102 generally comprises a block (or circuit) 120, a block (or circuit) 122 and a block (or circuit) 124. The circuits 120 to 124 may represent modules and/or blocks that may be implemented as hardware, software, a combination of hardware and software, or other implementations.

The signal DATA may be received by the circuit 120. The circuit 120 may generate and present the signals DH and DL. The circuit 122 may receive the signal DH. The signal EN may be generated by the circuit 122. The signal ADDR_IN may be received by the circuit 124. The circuit 124 may generate and present the signals AH and AL.

The circuit 120 may implement a data parser circuit. In both the write state and the compare state, the circuit 120 is generally operational to parse the input data value into the multiple portions (or parts). Several (e.g., N) most-significant bits may be parsed into the signal DH. Several (e.g., D-N) least-significant bits may be parsed into the signal DL. The value N may be related to the number of memory blocks (e.g., X) within the circuit 106, and in particular $X=2^N$.

The circuit 122 may implement a block enable circuit. In both the write state and the compare state, the circuit 122 may generate the signal EN based on the signal DH. For each N-bit value in the signal DH, the circuit 122 may assert a single bit in the signal EN and deassert the other bits. The single asserted bit generally identifies the particular memory block within the circuit 106 that is involved with a write or a compare.

The circuit 124 may implement an address parser circuit. In both the write state and the compare state, the circuit 124 is generally operational to parse the input address value into the multiple portions (or parts). Several (e.g., N) least-significant bits of the input address value may be parsed into the signal AL. Several (e.g., A-N) most-significant bits of the input address value may be parsed into the signal AH.

Figure 4:
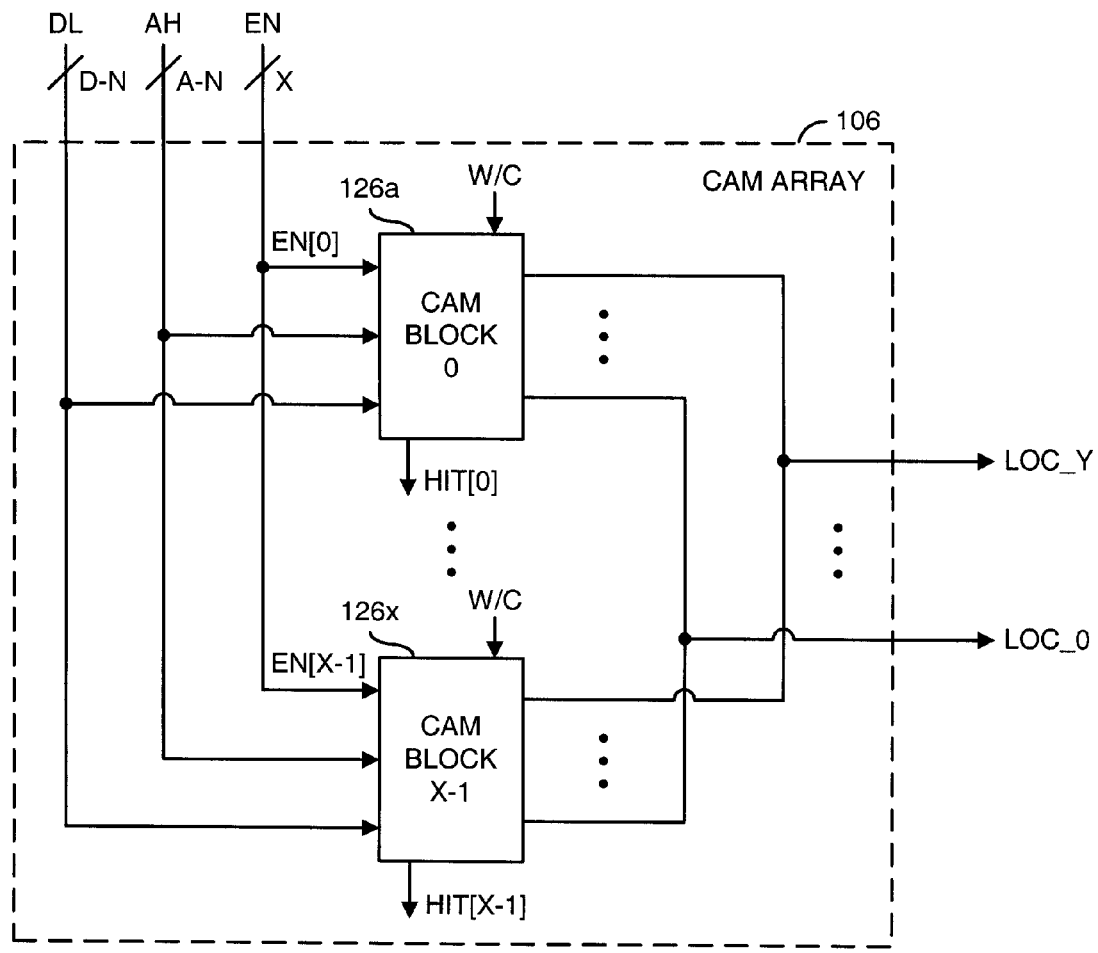
FIG. 4 is a block diagram of an example implementation of a CAM array circuit.

Referring to FIG. 4, a block diagram of an example implementation of the circuit 106 is shown. The circuit 106 generally comprises multiple blocks (or circuits) 126a-126x. The circuits 126a-126x may represent modules and/or blocks that may be implemented as hardware, software, a combination of hardware and software, or other implementations.

The signals DL, AH and W/C may be received by each circuit 126a-126x. A respective bit of the signal EN may be received by each circuit 126a-126x. Each circuit 126a-126x may generate the signals LOC_0-LOC-Y. The respective signals LOC_0-LOC_Y from each circuit 126a-126x may be wire-OR'd together within the circuit 106.

Each circuit 126a-126x may implement a CAM memory block. In the write state, each enabled circuit 126a-126x (one enabled at any given time) is generally operational to store the low data portions received in the signal DL at locations determined by the high address portion. The disabled circuits 126a-126x may ignore the low data portions in the signal DL. The circuit 100 may save power by enabling only a single circuit 126a-126x at a time.

In the compare state, each enabled circuit 126a-126x (one enabled at any given time) may compare the low data portion received in the signal DL with the low data portions previous stored. If at least one match is found, the respective bit of the signal HIT may be asserted. If no match is found, or if the memory block is disabled, the respective bit in the signal HIT may be deasserted. For each address location having a match, the corresponding signal LOC_0-LOC_Y may be asserted. The signals LOC_0-LOC_Y corresponding to non-matching address locations may be deasserted.

Figure 5:
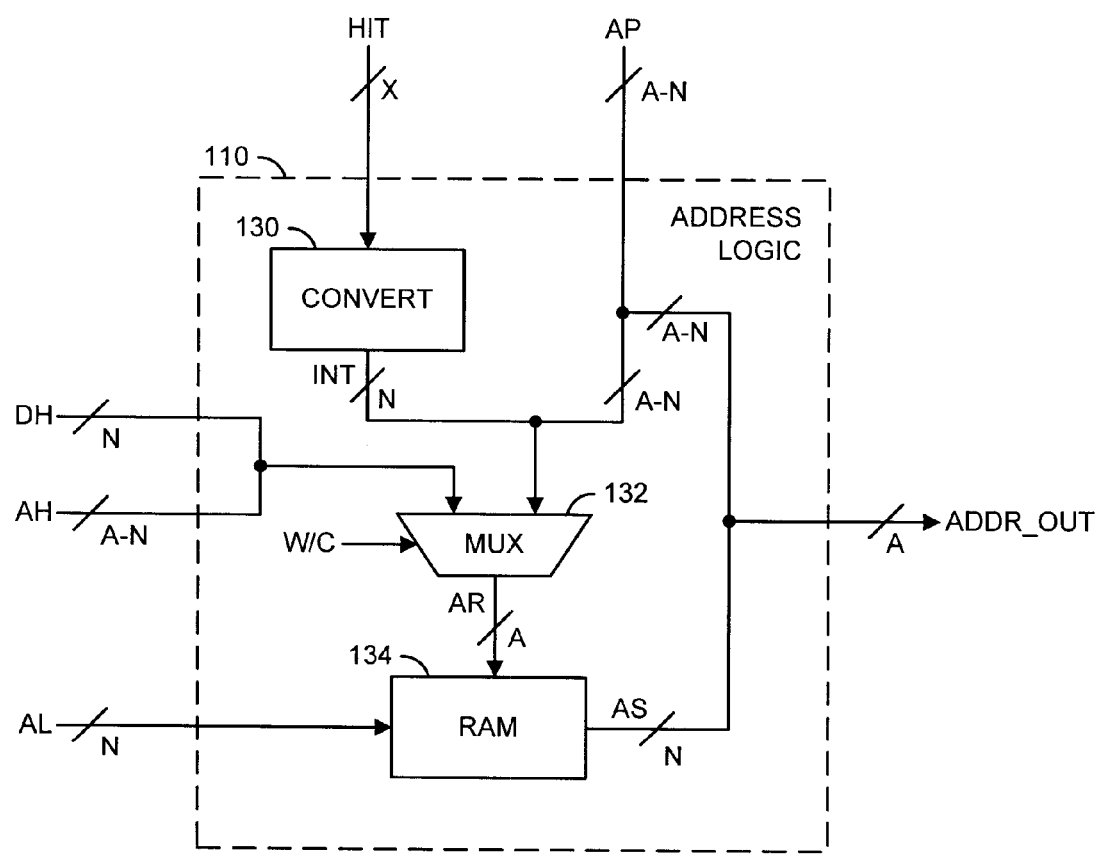
FIG. 5 is a block diagram of an example implementation of an address logic circuit.

Referring to FIG. 5, a block diagram of an example implementation of the circuit 110 is shown. The circuit 110 generally comprises a block (or circuit) 130, a block (or circuit) 132 and a block (or circuit) 134. The circuits 130 to 134 may represent modules and/or blocks that may be implemented as hardware, software, a combination of hardware and software, or other implementations.

The signal HIT may be received by the circuit 130. A signal (e.g., INT) may be generated by the circuit 130, concatenated with the signal AP and transferred to the circuit 132. The signals DH and AH may be concatenated in the circuit 110 and transferred to the circuit 132. The signal W/C may be received at a control input of the circuit 132. A signal (e.g., AR) may be generated by the circuit 132 and transferred to the circuit 134. The signal AL may be received by the circuit 134. A signal (e.g., AS) may be generated by the circuit 134, concatenated with the signal AP and presented as the signal ADDR_OUT.

The circuit 130 may implement a convert circuit. In the compare state (and optionally in the write state), the circuit 130 may be operational to convert the signal HIT into the intermediate signal INT. The conversion generally involves a creation of a binary number in the signal INT that identifies the circuit 126a-126x that asserted a bit in the signal HIT. For example, if the circuit 126a (e.g., memory block 0) asserts the corresponding bit in the signal HIT (e.g., HIT=0000 . . . 0001), the circuit 130 may generate a binary value of zero in the signal INT signifying a hit in the zero-th memory block. If the circuit 126d (e.g., memory block 3) asserts the corresponding bit in the signal HIT (e.g., HIT=0000 . . . 1000), the circuit 130 may generate binary value of 11 (e.g., three decimal) in the signal INT signifying a hit in the third memory block. If all of the bits in the signal HIT are deasserted (e.g., HIT=0000 . . . 0000), the circuit 130 may generate a don't care or out-of-range value in the signal INT signifying that the compare did not find any matches.

The circuit 132 may implement a multiplexer circuit. The circuit 132 is generally operational to multiplex (i) the concatenated address value of the signals DL and AH and (ii) the concatenated address value of the signals INT and AP. Control of the multiplexing is provided by the signal W/C. While the signal W/C is in the write state, the circuit 132 may route the concatenated value of the signals DH and AL to the signal AR. While the signal W/C is in the compare state, the circuit 132 may route the concatenated value of the signals INT and AP to the signal AR.

The circuit 134 may implement a random address memory (e.g., RAM) circuit having multiple addressable locations. In the write state, the circuit 134 is generally operational to store the low address portion received in the signal AL into an addressable location determined by the signal AR. In the compare state, the circuit 136 may be operational to read and present a low address portion in the signal AS. The read address location may be determined by the signal AR. The low address location in the signal AS concatenated with the highest priority address portion in the signal AP may form the output address value in the signal ADDR_OUT.

Figure 6:
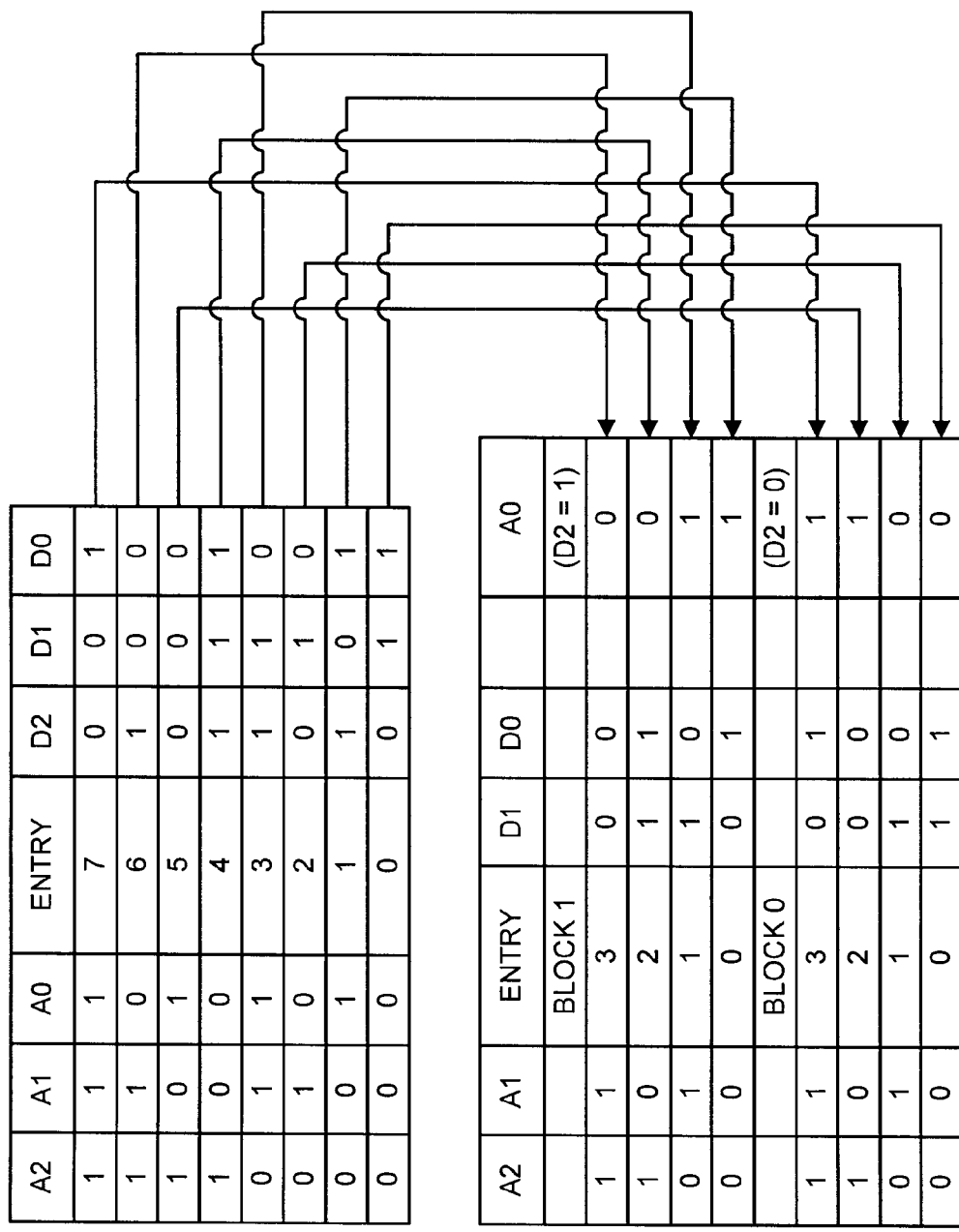
FIG. 6 is a diagram of an 8-entry CAM compared with a data clustering block storage.

Referring to FIG. 6, a diagram of an 8-entry CAM compared with a data clustering block storage is shown. The example generally illustrates contents of a CAM for both a typical CAM (top half) and the circuit 100 (bottom half). The circuit 100 generally uses N bits of the data word to replace N bits of the input address value to determine the memory block in which the data may be stored. The example set of data as illustrated generally includes 8 entries, each having multiple address bits (e.g., A2, A1, and A0) and corresponding data bits (e.g., D2, D1, and D0). In the example, the value of N may be 1. The high data portion (e.g., bit D2) is generally used instead of the low address portion (e.g., bit A0) to determine a memory block in which to store the low data portion (e.g., bits D1 and D0) All D2=1 data is generally stored in the CAM block 1. All D2=0 data may be stored in the CAM block 0.

The high data portion (e.g., bit D2) may be converted by the circuit 122 into block enable information (e.g., signal EN) during a compare since only the enabled block may contain data that might match the comparison data word. The low address portion (e.g., bit A0) may be stored circuit 134. The signal HIT is generally used as an index into the circuit 134 to read out the low address portion information. The low address portion read from the circuit 134 may be concatenated with the highest priority (encoded) address portion (e.g., signal AP) from the memory block being searched.

By way of example, a search on a compare data word=101 binary in a typical CAM (top half) results in entry 1 (A2=0, A1=0, A0=1). In the data clustering block architecture of the circuit 100, a search for the compare data word=101 binary generally results in the CAM block 1 being enabled and the CAM block 0 being disabled and thus using no dynamic power. A search in the enabled CAM block 1 for the binary pattern "01" may result in entry 0 (e.g., A2=0, A1=0). The low address portion A0=1 may also be read from the circuit 134 in the entry 0. Since only the entry 0 matches, the circuit 108 may generate the highest priority address portion value as 00 binary to represent the entry (or location) 0 in the enabled memory block. Concatenating the highest priority address portion 00 with the low address portion 1 results in an output address value of 001 binary in the signal ADDR_OUT. In the case of multiple hits, the circuit 108 generally determines the highest priority hit.

Figure 7:
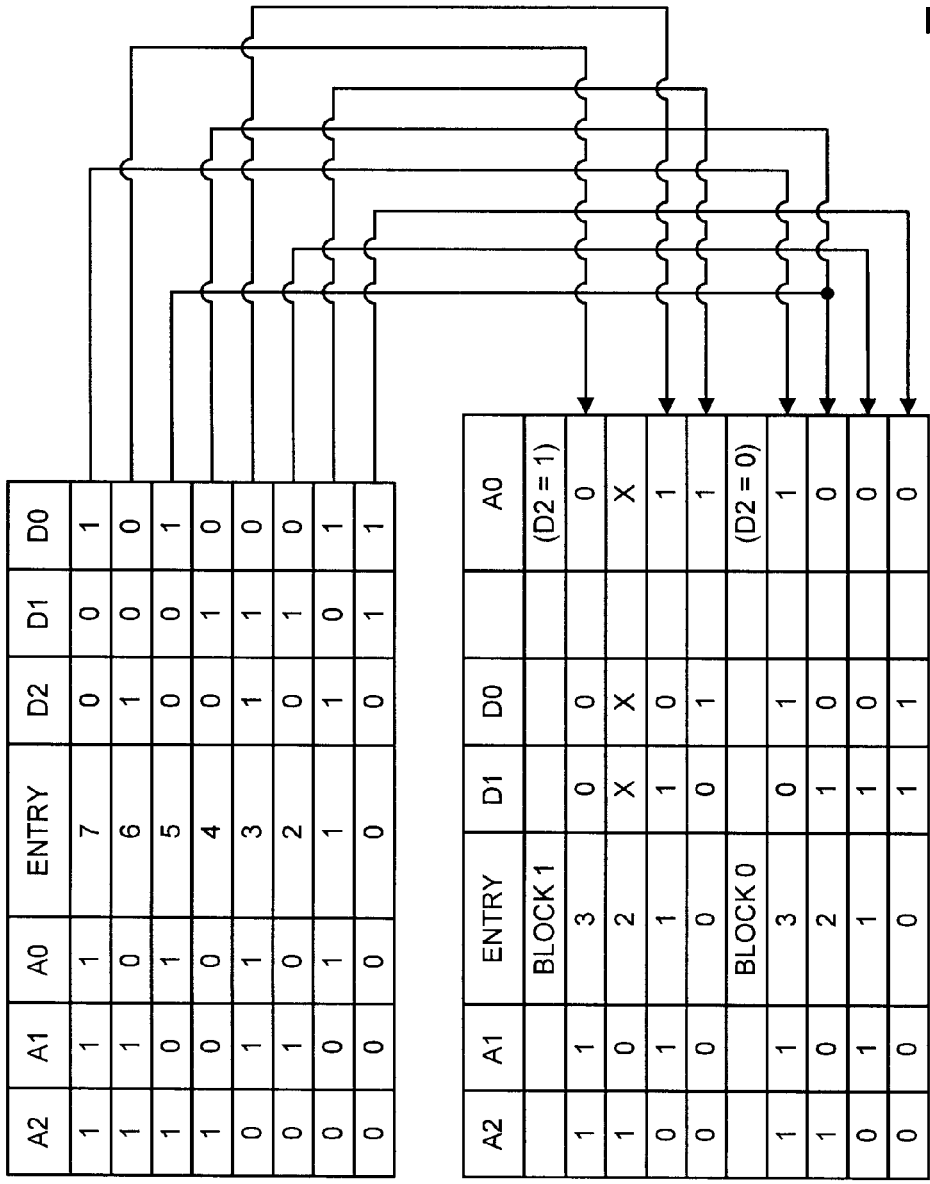
FIG. 7 is a diagram of a block collision compared with a data clustering block storage.

Referring to FIG. 7, a diagram of a block collision compared with a data clustering block storage is shown. The example generally illustrates contents of a CAM for both the typical CAM (top half) and the circuit 100 (bottom half). Because the data word bits are used for addressing, cases may exist in which two or more input data words may be mapped to the same address location within the same memory block of the circuit 100. The example set of data may illustrate writing an input data word=001 binary to address 4 and another input data word=010 binary to address 5. Both entries should be entered into block 0 entry 2 as the bit D2 of both entries is 0 and the bits A2=1 and A0=0 are the same for both entries. The example illustrates a "block collision" that is generally handled by the chip architecture. In some instances, the block collision may be handled by leaving an entry out of the circuit 100 resulting in a smaller effective CAM for a time (e.g., the block 1 entry 2 contains don't care data). In other instances, the block collision may be handled by swapping the conflicting data to get the latest data into the circuit 100. The swapping may be performed according to common replacement techniques, such as a least recently used technique. Adding more CAM memory blocks by swapping more data bits and address bits generally reduces the chance of block collisions and may decrease the average power consumption of the apparatus 90.

The functions performed by the diagrams of FIGS. 1-5 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:

1. An apparatus comprising:
   a first circuit configured to parse a first data word into a first data portion in a first signal and a second data portion in a second signal and parse a first address into a first address portion and a second address portion, wherein said first address portion contains higher order bits than said second address portion; and
   a second circuit comprising a plurality of memory blocks, said second circuit being configured to store said second data portion in said second signal in a particular one of said memory blocks using said first data portion in said first signal to determine said particular memory block and said first address portion to determine a particular one of a plurality of locations within said particular memory block, and generate a second address by concatenating said first address portion and said first data portion, wherein said first data portion is not stored in said apparatus and said particular location is determined independently of said second address portion.

2. The apparatus according to claim 1, wherein said first circuit and said second circuit are implemented in a content addressable memory using data clustering.

3. The apparatus according to claim 1, wherein said second circuit is further configured to store said second address portion at said second address in a memory circuit.

4. The apparatus according to claim 1, wherein said first circuit is further configured to parse a second data word into a third data portion and a fourth data portion.

5. The apparatus according to claim 4, wherein said second circuit is further configured to generate a plurality of first indicators in response to a seek of said fourth data portion in a given one of said memory blocks determined by said third data portion and generate a plurality of second indicators in response to said seek.

6. The apparatus according to claim 5, wherein said second circuit is further configured to generate a third address portion by prioritizing said first indicators.

7. The apparatus according to claim 6, wherein said second circuit is further configured to generate a third address based on said second indicators and said third address portion.

8. The apparatus according to claim 7, wherein said second circuit is further configured to read a fourth address portion from a memory circuit at said second address and generate a fourth address by concatenating said third address portion and said fourth address portion.

9. The apparatus according to claim 1, wherein said apparatus is implemented as one or more integrated circuits.

10. A method for data clustering in a plurality of memory blocks in an apparatus, comprising the steps of:
    (A) parsing a first data word into a first data portion in a first signal and a second data portion in a second signal;
    (B) parsing a first address into a first address portion and a second address portion, wherein said first address portion contains higher order bits than said second address portion;
    (C) storing said second data portion in said second signal in a particular one of said memory blocks using said first data portion in said first signal to determine said particular memory block and said first address portion to determine a particular one of a plurality of locations within said particular memory block, wherein said first data portion is not stored in said apparatus and said particular location is determined independently of said second address portion; and
    (D) generating a second address by concatenating said first address portion and said first data portion.

11. The method according to claim 10, wherein said method is implemented in a content addressable memory using data clustering.

12. The method according to claim 10, further comprising the step of:
    storing said second address portion at said second address in a memory circuit.

13. The method according to claim 10, further comprising the step of:
    parsing a second data word into a third data portion and a fourth data portion.

14. The method according to claim 13, further comprising the steps of:
    generating a plurality of first indicators in response to seeking said fourth data portion in a given one of said memory blocks determined by said third data portion; and
    generating a plurality of second indicators in response to said seeking.

15. The method according to claim 14, further comprising the step of:
    generating a third address portion by prioritizing said first indicators.

16. The method according to claim 15, further comprising the step of:
    generating a third address based on said second indicators and said third address portion.

17. The method according to claim 16, further comprising the steps of:
    reading a fourth address portion from a memory circuit at said second address; and
    generating a fourth address by concatenating said third address portion and said fourth address portion.

18. An apparatus comprising:
    means for parsing a first data word into a first data portion in a first signal and a second data portion in a second signal;
    means for parsing a first address into a first address portion and a second address portion, wherein said first address portion contains higher order bits than said second address portion; and
    means for storing said second data portion in said second signal in a particular one of a plurality of memory blocks using said first data portion in said first signal to determine said particular memory block and said first address portion to determine a particular one of a plurality of locations within said particular memory block, wherein said first data portion is not stored in said apparatus and said particular location is determined independently of said second address portion; and
    means for generating a second address by concatenating said first address portion and said first data portion.

* * * * *